(12) United States Patent
Horiuchi et al.

(10) Patent No.: US 7,005,207 B2
(45) Date of Patent: Feb. 28, 2006

(54) FUEL CELL

(75) Inventors: Michio Horiuchi, Nagano (JP); Shigeaki Suganuma, Nagano (JP); Misa Watanabe, Nagano (JP); Shuji Yamazaki, Nagano (JP)

(73) Assignee: Shinko Electric Industries Co. Ltd., Nagano (JP)

( * ) Notice: Subject to any disclaimer, the term of this patent is extended or adjusted under 35 U.S.C. 154(b) by 508 days.

(21) Appl. No.: 10/244,313

(22) Filed: Sep. 16, 2002

(65) Prior Publication Data

US 2003/0054222 A1 Mar. 20, 2003

(30) Foreign Application Priority Data

Sep. 17, 2001 (JP) ....................... 2001-281730

(51) Int. Cl.
  *H01M 2/00* (2006.01)
  *H01M 2/02* (2006.01)
  *H01M 2/14* (2006.01)
  *H01M 8/01* (2006.01)
  *H01M 8/12* (2006.01)

(52) U.S. Cl. ............... 429/34; 429/26; 429/38
(58) Field of Classification Search .............. 429/34, 429/38, 26
See application file for complete search history.

(56) References Cited

U.S. PATENT DOCUMENTS 4,212,929 A * 7/1980 Grevstad et al. ............. 429/37

| 4,863,813 | A | | 9/1989 | Dyer |
| 5,094,928 | A | | 3/1992 | Dyer |
| 5,482,792 | A | * | 1/1996 | Faita et al. ................. 429/30 |
| 5,750,280 | A | * | 5/1998 | Akagi ....................... 429/32 |

FOREIGN PATENT DOCUMENTS

| EP | 0 445 597 A | | 9/1991 |
| GB | 1 213 130 A | | 11/1970 |
| JP | 60054178 | | 9/1983 |
| JP | 59-098471 | * | 6/1984 |
| JP | 61-203572 A | * | 9/1986 |
| JP | 11185774 | | 9/1999 |
| JP | 2002243412 | | 9/1999 |

* cited by examiner

*Primary Examiner*—Patrick Joseph Ryan
*Assistant Examiner*—Julian Mercado
(74) *Attorney, Agent, or Firm*—Paul & Paul

(57) ABSTRACT

A fuel cell comprising a container having at least one feed port and at least one exhaust port, and a stack of fuel cell elements contained in the container in such a manner that the circumferential faces of the stack of fuel cell elements and the inner surfaces of the container are contacted, the element comprising a cathode layer, an anode layer, and an electrolyte layer, with the electrolyte layer being interposed between the cathode and anode layers, and a mixed gas containing a fuel gas and oxygen being fed to the fuel cell from the feed port, and an exhaust gas is discharged from the exhaust port, wherein packing materials are filled in each of the spaces between the feed port and the stack of fuel cell elements and between the stack of fuel cell elements and the exhaust port, and wherein there is a gap between the adjacent packing materials, at which gap the mixed fuel gas cannot be ignited at the operating condition of the fuel cell even if the mixed fuel gas has an oxygen concentration within the ignition limits for the mixed fuel gas.

22 Claims, 5 Drawing Sheets

FUEL CELL

BACKGROUND OF THE INVENTION

1. Field of the Invention

The invention relates to a fuel cell and, more particularly, to a fuel cell comprising a container which has a feed port or ports, for a mixed fuel gas containing a fuel gas, such as methane, and oxygen, and an exhaust port or ports for an exhaust gas, and in which an element or elements for the fuel cell are contained.

2. Description of the Related Art

A fuel cell can be expected to have high efficiency in power generation compared to power generation in a thermal power plant, and is currently being studied by many researchers.

As shown in FIG. 4, such a conventional fuel cell is provided with an element 106 for the fuel cell, which element uses, as a solid electrolyte layer 100 of an oxygen ion conduction type, a fired body made of stabilized zirconia to which yttria ($Y_2O_3$) is added, the solid electrolyte layer 100 having one side on which a cathode layer 102 is formed, and another side on which an anode layer 104 is formed. Oxygen or an oxygen-containing gas is fed to the side of the cathode layer 102 of the fuel cell element 106, and a fuel gas, such as methane, is fed to the side of the anode layer 104.

The oxygen ($O_2$) fed to the side of the cathode layer 102 of the fuel cell element 106 is ionized into oxygen ions ($O^{2-}$) at the boundary between the cathode layer 102 and the solid electrolyte layer 100, and the oxygen ions are conducted to the anode layer 104 by the electrolyte layer 100. The oxygen ions conducted to the anode layer 104 react with the methane ($CH_4$) gas fed to the side of the anode layer 104, to thereby form water ($H_2O$), carbon dioxide ($CO_2$), hydrogen ($H_2$), and carbon monoxide (CO). During the reaction, the oxygen ions release electrons, resulting in a potential difference between the cathode layer 102 and the anode layer 104. Accordingly, by establishing an electrical connection between the cathode layer 102 and the anode layer 104 by a lead wire 108, the electrons of the anode layer 104 pass in the direction toward the cathode layer 102 through the lead wire 108, and electricity can be produced by the fuel cell.

The fuel cell shown in FIG. 4 is operated at a temperature of about 1000° C. At such a high temperature, the side of cathode layer 102 of the fuel cell is exposed to an oxidizing atmosphere, and the side of anode layer 104 is exposed to a reducing atmosphere. Consequently, it has been difficult to enhance the durability of the element 106.

It is reported, in Science, vol. 288, pp2031–2033 (2000), that, as shown in FIG. 5, even when a fuel cell element 206 made up of a solid electrolyte layer 200, and a cathode layer 202 and an anode layer 204 respectively formed on one side and another side of the electrolyte layer 200, is placed in a mixed fuel gas of methane and oxygen, the fuel cell element 206 develops an electromotive force.

By placing the element 206 in a mixed fuel gas, as in the fuel cell illustrated in FIG. 5, the element 206 can be enveloped as a whole in substantially the same atmosphere, and can have improved durability compared to the element 106 shown in FIG. 4 in which the respective sides of the element 106 are exposed to atmospheres different from each other.

Nevertheless, since a mixed fuel gas of methane and oxygen is fed to the fuel cell shown in FIG. 5, at a high temperature of about 1000° C., the mixed fuel gas is adjusted to contain oxygen at a concentration smaller than the ignition limit (lower ignition limit) concentration of oxygen for the mixture of methane and oxygen (a concentration of methane exceeding the ignition limit (upper ignition limit) concentration of methane for the mixture of methane and oxygen) prior to being fed to the fuel cell, in order to avoid the danger of explosion.

For this reason, with the mixed fuel gas fed to the fuel cell, the amount of oxygen is too low for the fuel, such as methane, to be completely burnt, and the fuel may be carbonized to thereby reduce the performance of the fuel cell.

SUMMARY OF THE INVENTION

It is an object of the invention to provide a fuel cell which can use a mixed fuel gas of a fuel, such as methane, and oxygen, at a concentration of oxygen increased to a level at which the carbonization of the fuel can be prevented, while preventing an explosion of the mixed fuel gas.

To this end, the inventors considered that the explosion-proof structure of the space other than a fuel cell element or elements in a container of a fuel cell is significant, and consequently found that the explosion of a mixed fuel gas can be prevented by filling the space with packing materials in such a manner that there is a gap between the adjacent packing materials and/or the packing material has a gap, at which gap the mixed fuel gas cannot be ignited even if the mixed fuel gas has a fuel gas concentration within the ignition limits.

Thus, the invention resides in a fuel cell comprising a container having at least one feed port and at least one exhaust port, and a stack of fuel cell elements contained in the container in such a manner that the circumferential faces of the stack of fuel cell elements and the inner surfaces of the container are contacted, the element comprising a cathode layer, an anode layer, and an electrolyte layer, with the electrolyte layer being interposed between the cathode and anode layers, and a mixed gas containing a fuel gas and oxygen being fed to the fuel cell from the feed port, and an exhaust gas is discharged from the exhaust port, wherein packing materials are filled in each of the spaces between the feed port and the stack of fuel cell elements and between the stack of fuel cell elements and the exhaust port, and wherein there is a gap between the adjacent packing materials, in which gap the mixed fuel gas cannot be ignited at the operating condition of the fuel cell even if the mixed fuel gas has an oxygen concentration within the ignition limits for the mixed fuel gas.

Preferably, the gap between the adjacent packing materials is smaller than the quenching distance for the mixed fuel gas having an oxygen concentration within the ignition limits.

More preferably, the maximum gap between the packing materials is equal to or smaller than the quenching diameter for the mixed fuel gas.

In the fuel cell according to the invention, a heater may be provided to heat a portion of the fuel cell where the stack of fuel cell elements is contained, and cooling means may be provided to cool the spaces of the fuel cell in which the packing materials are filled.

Preferably, the packing material is a powder particle, a porous body, or a small tube made up of a metal or ceramic which is stable at the operating conditions of the fuel cell.

More preferably, the packing material is a powder particle having a diameter of 50 to 1,000 micrometers, or a porous body having an open porosity of 50% or larger, or a tube having an inner diameter of 100 to 200 micrometers.

The tubes may be filled in the spaces so as to be arranged in the direction of the flow of the mixed fuel gas.

Alternatively, the tubes may be filled in the spaces at random.

The packing material may be formed of a metal selected from the group consisting of Ti, Cr, Te, Co, Ni, Cu, Al, Mo, Rh, Pd, Ag, W, Pt and Au or an alloy of two or more of them, or formed of a ceramic comprising one or more selected from the group consisting of Mg, Al, Si and Zr.

In the fuel cell according to the invention, the stack of fuel cell elements is formed of the fuel cell elements stacked in such a manner that the cathode layer of one element and the anode layer of another element are in direct contact to each other.

In an embodiment of the fuel cell according to the invention, at least the cathode and anode layers of the stack of fuel cell elements are porous, and the stack of fuel cell elements is contained in the container so that the layers of the stack of fuel cell elements are parallel to the direction of flow of the mixed fuel gas traveling from the one space to the other.

In another embodiment, the cathode, anode and electrolyte layers of the stack of fuel cell elements are porous, and the stack of fuel cell elements is contained in the container so that the layers of the stack of fuel cell elements are perpendicular to the direction of flow of the mixed fuel gas traveling from one space to another.

Preferably, the porous layers have an open porosity of equal to or greater than 20%, more preferably 30 to 70%, and most preferably 40 to 50%.

Preferably, the cathode layer is formed of a manganite, gallate or cobaltite compound of lanthanum to which an element of group III of the periodic table is added.

Preferably, the anode layer is formed of a body supporting nickel cermet or platinum to which an electrolyte forming the electrolyte layer is added.

Also preferably, the electrolyte layer is formed of a zirconia which is partially stabilized by an element of group III of the periodic table, or a cerium oxide which is doped with lanthanide.

In an embodiment of the invention, the fuel cell may comprise a single fuel cell element in place of the stack of fuel cell elements.

BRIEF DESCRIPTION OF THE DRAWINGS

The above and other objects and advantages of the invention will be well understood and appreciated by a person with ordinary skill in the art, from consideration of the following detailed description made by referring to the attached drawings, wherein.

DETAILED DESCRIPTION OF THE INVENTION

Figure 1:
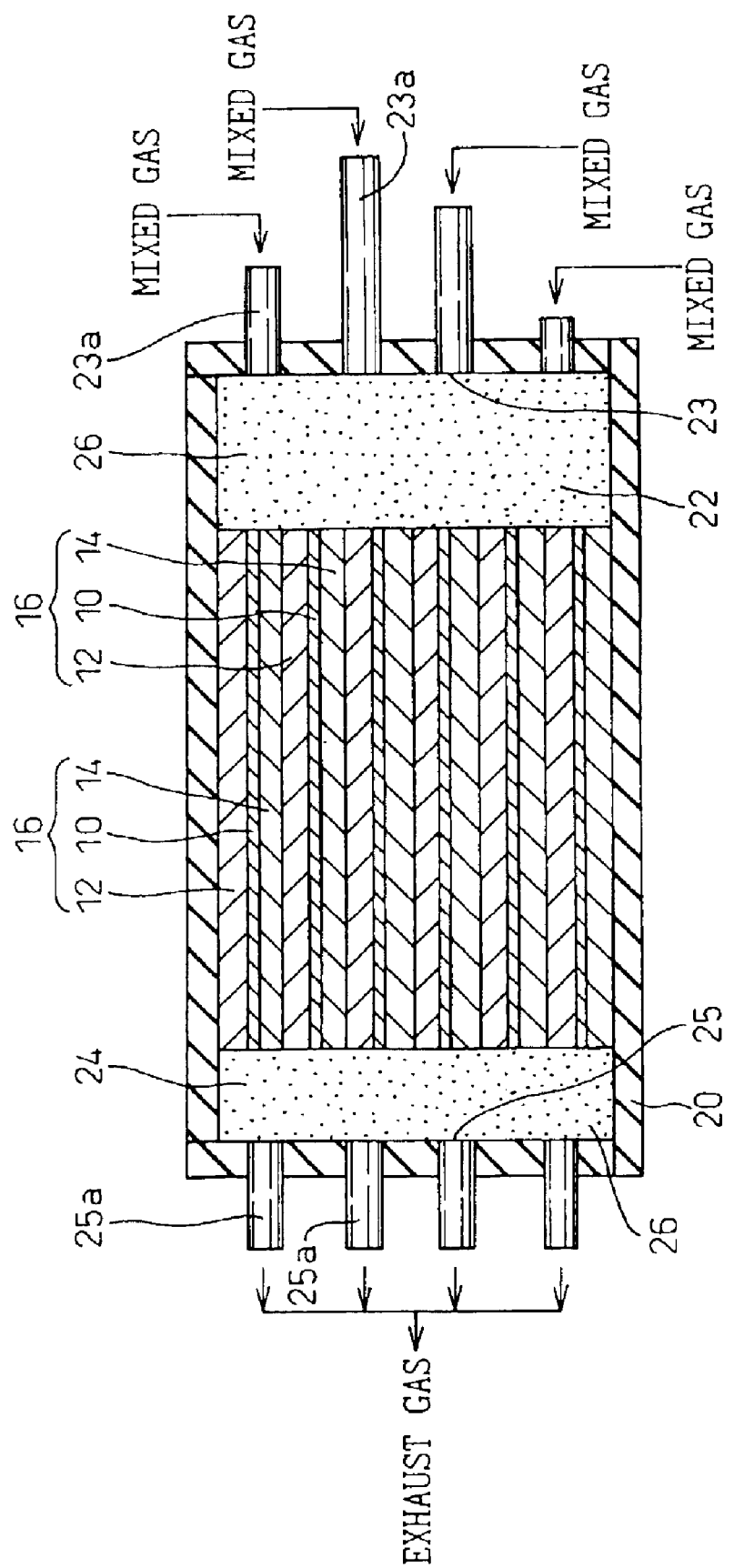
FIG. 1 is a schematic sectional view illustrating an embodiment of the fuel cell according to the invention.

FIG. 1 schematically shows an embodiment of the fuel cell according to the invention. This fuel cell comprises a container 20 having a rectangular, circular or the like cross-section and having a plurality of feed ports 23 and a plurality of exhaust ports 24, each of the feed ports 23 being connected to a feed pipe 23a, and each of the exhaust ports 24 being connected to an exhaust pipe 25a, and a stack of a plurality of unit fuel cell elements 16 contained in the container 20. A mixed fuel gas containing a fuel, such as methane, and oxygen is fed to the container at the feed ports 23, and exhaust gas is discharged from the container through the exhaust ports 24, and made up of two fuel cell elements 16.

The container 20 is formed of a thermally resistant material, such as a ceramic, capable of withstanding a temperature of up to about 1200° C., so as to show sufficient thermal resistance at an operating temperature of the fuel cell.

Each of the elements 16 forming the stack of fuel cell elements comprises a solid electrolyte layer 10 having a dense structure, and a porous cathode layer 12 and a porous anode layer 14 formed on the respective sides of the solid electrolyte layer 10. The anode layer 14 of the element 16 is directly joined to the cathode layer 12 of the adjacent element 16, to form the stack of a plurality of fuel cell elements. Electricity generated by the stack of elements 16 in the fuel cell is taken out using leads (not shown) connected to the respective outermost layers (i.e., the top cathode layer 12 and the bottom anode layer 14) of the stack.

The solid electrolyte layer 10 used to fabricate each of the elements 16 shown in FIG. 1 is an oxygen ion conductor, and is formed of a zirconium oxide (zirconia) which is partially stabilized by an element of group III of the periodic table, such as yttrium (Y) or scandium (Sc), or a cerium oxide which is doped with, for example, samarium (Sm) or gadolinium (Gd). The electrolyte layer may be or may not be porous.

The cathode layers 12 are formed of manganite, gallate or cobaltite compounds of lanthanum to which an element of group III of the periodic table, such as strontium (Sr), is added. The anode layers 14 are formed of a body supporting nickel cermet or platinum to which 10 to 30% by weight of an electrolyte forming the solid electrolyte layer 10 is added. The cathode layers 12 and anode layers 14 formed of such materials are porous, and are preferred to have an open porosity equal to or greater than 20%, more preferably 30 to 70%, and most preferably 40 to 50%.

The stack of fuel cell elements 16 shown in FIG. 1 can be fabricated by placing green sheets for the cathode layer and the anode layer on the respective sides of a pre-fired solid electrolyte layer 10, or applying pastes for the cathode layer and the anode layer to the respective sides of a pre-fired solid electrolyte layer, and firing the assembly of the green sheets or pastes and the pre-fired solid electrolyte layer together.

The stack of fuel cell elements 16 can be obtained by stacking a necessary number of assemblies of the green sheets or pastes and the pre-fired solid electrolyte layer, and firing them together. Alternatively, the stack of fuel cell elements 16 may be obtained by stacking a necessary number of fired assemblies to thereby integrate them.

The cathode layers 12 and anode layers 14 used in the fuel cell shown in FIG. 1 are porous and, consequently, a mixed fuel gas fed from the feed pipes 23a can pass through them. To take advantage of this, the stack of fuel cell elements 16 of the fuel cell shown in FIG. 1 is contained in the container 20 so that the cathode layers 12 and the anode layers 14 are arranged parallel to the direction of flow of the mixed fuel gas fed from the feed pipes 23a. In order for the mixed gas fed to the container 20 to pass through the cathode layers 12 and the anode layers 14 without bypassing them, all or at least part of the outer faces of the stack of fuel cell elements 16 is brought into intimate contact with the inner faces of the container 20, and the mixed gas fed into the container 20 is prevented from bypassing the stack through the gaps between the container inner faces and the stack outer faces. A material having a low porosity, such as alumina cement or higher melting-point glass, may be used to seal the gap between the container inner faces and the stack outer faces, as required.

The container 20 has spaces 22 and 24 between the feed ports 23 and the stack of fuel cell elements 16 and between the stack of elements 16 and the exhaust ports 24, respectively. If these spaces 22, 24 are empty, it is required that the oxygen concentration in a mixed fuel gas is less than the ignition limit (lower ignition limit) concentration of oxygen for the mixed gas (a concentration of fuel gas, such as methane, is higher than the ignition limit (upper ignition limit) concentration of the fuel gas for the mixed gas), in order to prevent the mixed fuel gas from being ignited at a high temperature, about 1000° C., at which the fuel cell is operated.

In the case of the use of a mixed gas having a low concentration of oxygen, as a mixed gas to be fed to the stack of fuel cell elements 16, the fuel gas, such as methane, in the mixed gas can be carbonized to thereby reduce the performance of the fuel cell. On the other hand, if the mixed gas has an oxygen concentration at which the fuel gas will be not carbonized, the composition of the mixed gas in the space 22 is within the ignition limit to thereby remarkably increase the danger of explosion.

In the fuel cell shown in FIG. 1, packing materials 26 are filled in the spaces 22, 24 in such a manner that there is a gap between the adjacent packing materials, at which gap the mixed fuel gas cannot be ignited at the operating condition of the fuel cell even if the mixed fuel gas has an oxygen concentration (or fuel gas concentration) within the ignition limits.

Specifically, the packing materials 26 are filled so that the gap between the adjacent packing materials is smaller than the quenching distance for the mixed gas having a concentration within the ignition limits. Thus, even if the mixed fuel gas fed to the container 20 has an increased oxygen concentration at which the mixed fuel gas is ignited, the ignition within the spaces 22, 24 can be avoided.

The "quenching distance" as used herein is defined in the Chemical Handbook, Basic Edition II, 2nd edition, edited by Japanese Chemical Association, p. 407, Apr. 15, 1987, and means a minimum distance between electrodes at which a mixed gas can be ignited. At a distance smaller than the minimum distance, no ignition occurs however large an energy is given to a mixed gas. The quenching distance varies depending on the oxygen concentration, the pressure and the like of a mixed gas and, accordingly, it is preferred that the quenching distance for the mixed gas in the spaces 22, 24 is experimentally determined in advance at the operating conditions of the fuel cell.

The gaps between the packing materials filled in the spaces 22, 24 are not uniform, and have a distribution. For this reason, there can be a case where although the gaps between the packing materials are, on average, smaller than the quenching distance of a mixed gas in the spaces 22, 24, some of the gaps are larger than the quenching distance. In this case, the ignition of the mixed gas can lead to detonation, and the detonation can be prevented even if the mixed gas is ignited, by limiting the maximum gap between the packing materials 26 to a distance equal to or smaller than the quenching diameter for the mixed fuel gas, at which the detonation of the mixed gas in the spaces 22, 24 of the fuel cell can be inhibited. The "quenching diameter" as used herein means a critical diameter of a tube below which combustion wave generated by the ignition of a mixed gas blown out of the tube cannot intrude (flash back) into the tube, and described in, e.g., Bernard Lewis and Guenther von Elbe, Combustion, Flames and Explosions of Gases, 3rd edition, Academic Press, Inc., p. 240 (1987). For example, the quenching diameter of a mixed gas of methane and oxygen is 0.1 to 3 millimeters.

As the packing material 26 to be filled in the spaces 22, 24 of the fuel cell shown in FIG. 1, a powder particle, a porous body, or a small tube made up of a metal or ceramic which is stable at the operating conditions of the fuel cell, can be used.

Such a powder particle, porous body, or tube may be formed of a metal selected from the group consisting of Ti, Cr, Te, Co, Ni, Cu, Al, Mo, Rh, Pd, Ag, W, Pt and Au or an alloy of two or more of them, or may be formed of a ceramic comprising one or more selected from the group consisting of Mg, Al, Si and Zr.

It is preferred that the powder particle has a diameter of 50 to 1,000 micrometers, and the porous body has an open porosity of 50% or larger. As the small tube, a tube having an inner diameter of 100 to 200 micrometers can be preferably used. Long tubes may be filled in the spaces 22, 24 to be arranged in the direction of the flow of the mixed gas, or short tubes may be filled in the spaces 22, 24 at random.

In addition, the packing material may be filled in the feed pipes 23a in order to prevent the ignition therein of the mixed gas fed to the fuel cell.

In the fuel cell shown in FIG. 1, the mixed gas is fed thereto through a plurality of feed pipes 23a. By dividedly feeding the mixed gas to the fuel cell in this way, the ignition of the mixed gas in the feed pipe 23a is prevented to the utmost.

The mixed gas fed to the space 22 of the container 20 passes through the gaps between the packing materials 26 filled therein to reach the stack of fuel cell elements 16, and flows through the cathode layers 12 and anode layers 14 toward the space 24. During this time, the mixed gas diffuses into the pores of the cathode layers 12 and anode layers 14, and reaches the surface of the solid electrolyte layers 10. A combustible gas component, such as methane, of the mixed gas which has reached the surface of the solid electrolyte layer 10 electrochemically reacts with oxygen ions which have passed through the solid electrolyte layer 10, to form water ($H_2O$), carbon dioxide ($CO_2$), hydrogen ($H_2$), and carbon monoxide (CO), while electrons are released from the oxygen ions. As the mixed gas travels toward the space 24, it is decreased in the amount of oxygen, and is increased in the amounts of water, carbon dioxide, hydrogen, and carbon monoxide. The water, carbon dioxide, hydrogen, and carbon monoxide thus formed are discharged from the space 24 through the exhaust pipes 24a.

Although as the mixed gas travels through the cathode layers 12 and anode layers 14 toward the space 24, it is decreased in the amount of oxygen, as referred to above, there is a possibility that the mixed gas entering the space 24 still has an oxygen concentration within the ignition limit (lower ignition limit) concentration of oxygen for the mixed gas. Accordingly, it is required that the space 24, like the space 22, is also filled with the packing materials 26 to have an explosion-proof structure.

As the mixed gas fed to the fuel cell shown in FIG. 1, a mixed gas of a combustible gas, such as hydrogen, methane, ethane, propane, or butane, or a mixture thereof, and air can be preferably used.

In the fuel cell shown in FIG. 1, as the solid electrolyte layer 10 constituting the fuel cell element 16 has a dense structure, the stack of fuel cell elements 16 is contained in the container 20 so that the cathode layers 12 and the anode layers 14 also constituting the fuel cell elements 16 are parallel to the direction of flow of the mixed gas fed to the container 20 through the feed pipes 23a, to thereby render the cathode layers 12 and the anode layers 14, which are porous layers, passageways for the mixed gas. In the fuel cell of this type it is difficult to seal between the circumferential faces of the stack of fuel cell elements 16 and the inner surfaces of the container 20.

Figure 2:
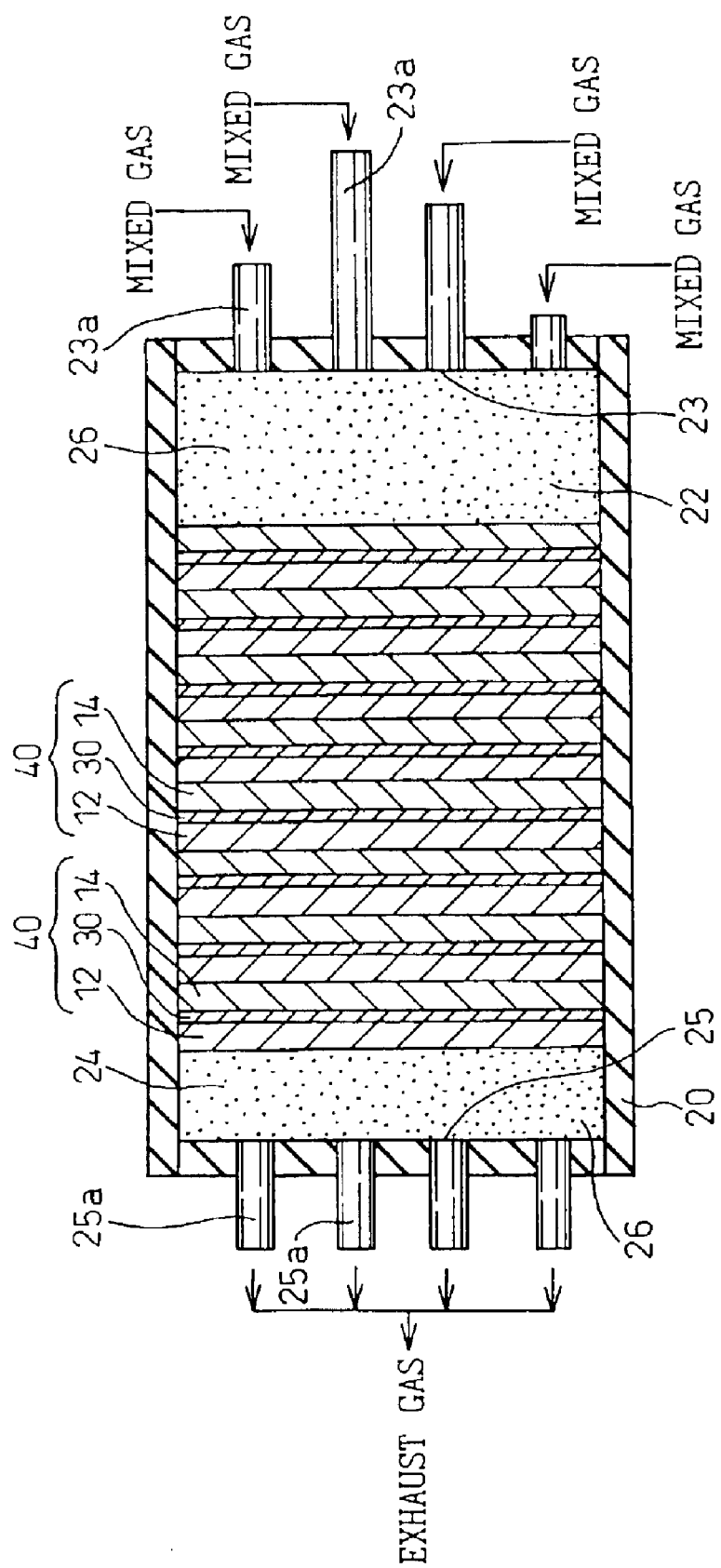
FIG. 2 is a schematic sectional view of another embodiment of the fuel cell according to the invention.

As shown in FIG. 2, the fuel cell can be easily sealed between the circumferential faces of the stack of fuel cell elements 40 and the inner surfaces of the container 20 by containing the stack of fuel cell elements 40, each of which is formed of a cathode layer 12, a solid electrolyte layer 30, and an anode layer 14, in the container so that the cathode layers 12 and the anode layers 14 constituting the fuel cell elements 40 are perpendicular to the direction of flow of the mixed gas fed to the container 20 through the feed pipes 23a. As the mixed gas is needed to pass through the stack of fuel cell elements 40 from one space 22 to the other space 24, each of the cathode layers 12, anode layers 14, and solid electrolyte layers 30 of the stack of fuel cell elements 40 is formed of a porous material. In the fuel cell shown in this drawing, members other than the stack of fuel cell elements 40 are the same as those earlier described referring to FIG. 1, and are not illustrated herein.

The stack of fuel cell elements 40 shown in FIG. 2 can be obtained by firing the stack of green sheets, for the respective layers, formed to have a certain shape. Thus, the stack of fuel cell elements 40 shown in FIG. 2 can be made at a lower cost compared to the stack of fuel cell elements 16 shown in FIG. 1, which is made by placing green sheets for the cathode layer and the anode layer, formed to have a certain shape, on the respective sides of a pre-fired solid electrolyte layer 10, or applying pastes for the cathode layer and the anode layer to the respective sides of a pre-fired solid electrolyte layer, and then firing the assembly of the green sheets or pastes and the pre-fired solid electrolyte layer together.

In the fuel cell shown in FIG. 2, the mixed gas fed to the fuel cell from the feed pipes 23a causes electrochemical reactions while passing through the porous cathode, anode and electrolyte layers 12, 14, 30, and is then discharged from the fuel cell via the exhaust pipes 25a.

Figure 3:
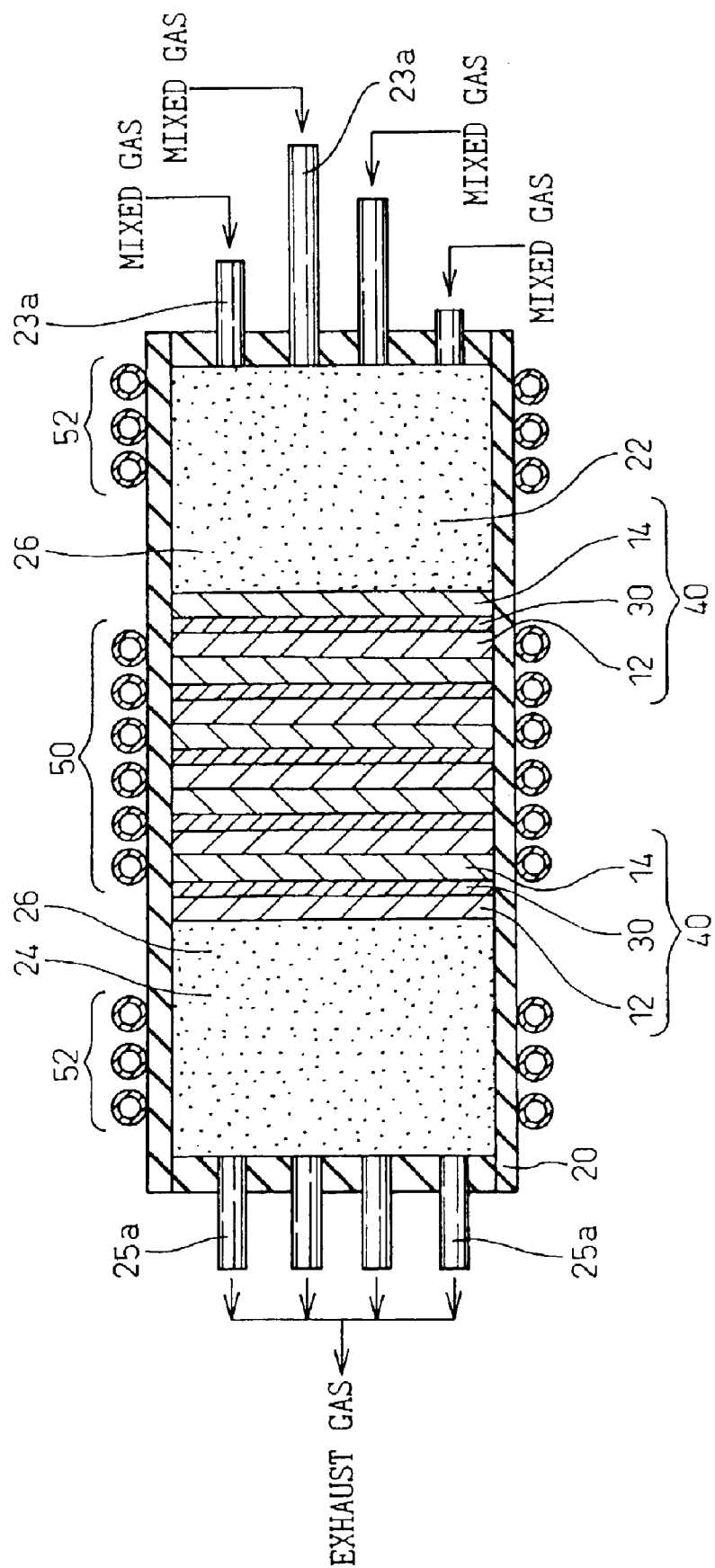
FIG. 3 is a schematic sectional view of a further embodiment of the fuel cell according to the invention.
Figure 4:
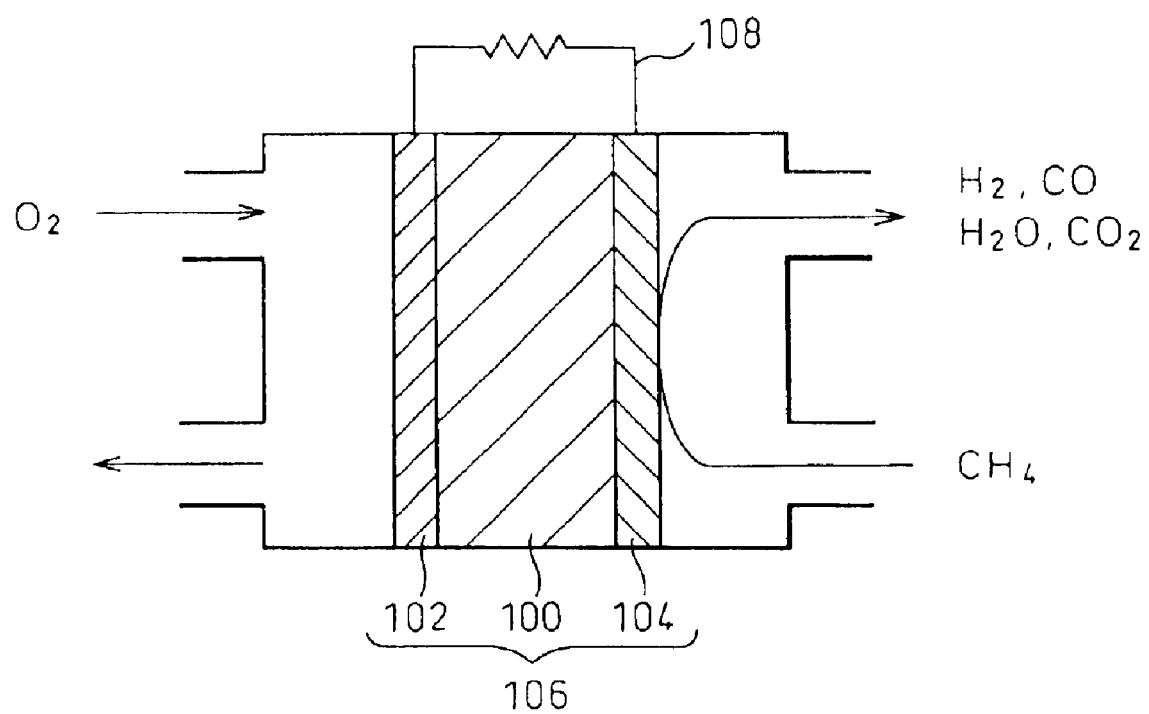
FIG. 4 illustrates a fuel cell of the prior art.
Figure 5:
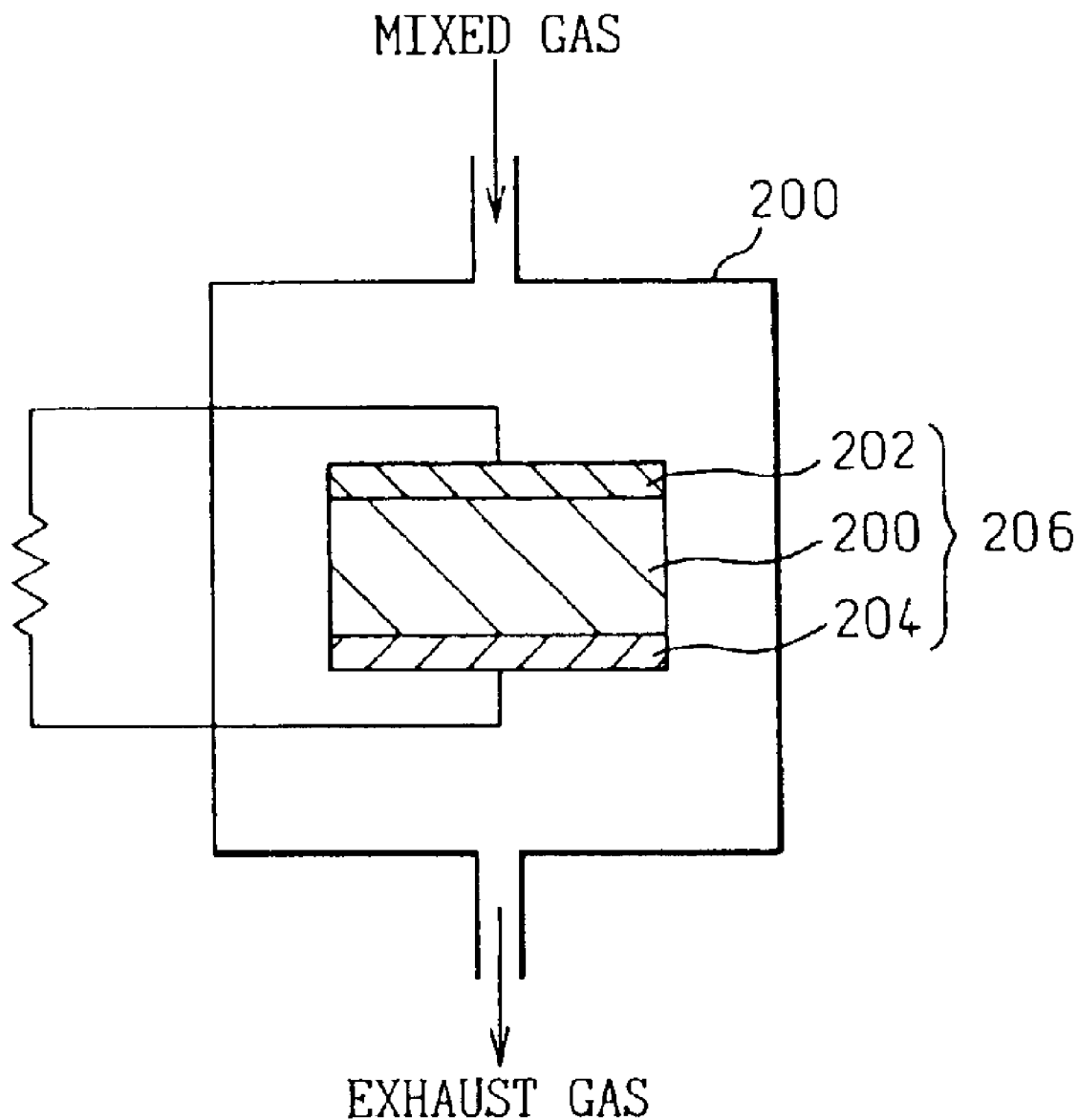
FIG. 5 illustrates a new type of fuel cell recently reported.

The fuel cells shown in FIGS. 1 and 2 generate electricity under the conditions in which the entire fuel cell is in a certain temperature atmosphere. As shown in FIG. 3, a heater 50 may be provided as a heating means for heating a portion of the fuel cell where the stack of fuel cell elements 40 is contained, and cooling tubes 52 as cooling means may be provided at the vicinity of the stack of fuel cell elements 40 and outside the spaces 22, 24 in which the packing material 26 is filled. By cooling the mixed gas in the spaces 22, 24 in this way, the quenching diameter for the mixed gas in the spaces 22, 24 can be increased.

When the spaces 22, 24 are forcedly cooled as described above, the packing material 26 filled in the spaces 22, 24 is preferably made of a metal or an alloy of metals having a good thermal conductivity.

For the fuel cell shown in FIG. 3, the members other than the heater 50 and the cooling tubes 52 are the same as those earlier described referring to FIGS. 1 and 2, and are not illustrated herein.

Although the fuel cells according to the invention illustrated in FIGS. 1 to 3 use a plurality of stacked fuel cell elements, the invention may be also applied to a fuel cell using a single fuel cell element contained in a container provided that a mixed gas can be prevented from passing through the gaps between the fuel cell element and the container to bypass the fuel cell element.

As described, according to the invention, electricity can be safely generated in a fuel cell using a mixed fuel gas having an oxygen concentration falling within the ignition limits for the mixed fuel gas. Thus, the invention makes it possible to prevent the performance of fuel cell being lowered due to the carbonization of the fuel in the mixed gas caused in the case of a significantly low concentration of oxygen in the mixed gas, to thereby enhance the power generation efficiency.

What is claimed is:

1. A fuel cell comprising a container having at least one feed port and at least one exhaust port, and a stack of fuel cell elements contained in the container in such a manner that the circumferential faces of the stack of fuel cell elements and the inner surfaces of the container are contacted, the element comprising a cathode layer, an anode layer, and an electrolyte layer, with the electrolyte layer being interposed between the cathode and anode layers, and a mixed gas containing a fuel gas and oxygen being fed to the fuel cell from the feed port, and an exhaust gas is discharged from the exhaust port, wherein there are spaces between the feed port and the stack of fuel cell elements and between the stack of fuel cell elements and the exhaust port, wherein packing materials are filled in each of the spaces between the feed port and the stack of fuel cell elements and between the stack of fuel cell elements and the exhaust port, and wherein there is a gap between adjacent packing materials, at which gap the mixed fuel gas cannot be ignited at the operating condition of the fuel cell even if the mixed fuel gas has an oxygen concentration within ignition limits for the mixed fuel gas.

2. The fuel cell of claim 1, wherein the gap between the adjacent packing materials is smaller than the quenching distance for the mixed fuel gas having an oxygen concentration within the ignition limits.

3. The fuel cell of claim 2, wherein the maximum gap between the packing materials is equal to or smaller than the quenching diameter for the mixed fuel gas.

4. The fuel cell of claim 1, wherein a heater is provided to heat a portion of the container where the stack of fuel cell elements is contained, and cooling means is provided to cool the spaces of the fuel cell in which the packing materials are filled.

5. The fuel cell of claim 1, wherein the packing material is a powder particle, a porous body, or a small tube made of a metal or a ceramic which is stable at the operating conditions of the fuel cell.

6. The fuel cell of claim 1, wherein the packing material is a powder particle having a diameter of 50 to 1,000 micrometers.

7. The fuel cell of claim 1, wherein the packing material is a porous body having an open porosity of 50% or larger.

8. The fuel cell of claim 1, wherein the packing material is a tube having an inner diameter of 100 to 200 micrometers.

9. The fuel cell of claim 8, wherein the tubes are filled in the spaces so as to be arranged in the direction of the flow of the mixed fuel gas.

10. The fuel cell of claim 8, wherein the tubes are filled in the spaces at random.

11. The fuel cell of claim 1, wherein the packing material is formed of a metal selected from the group consisting of Ti, Cr, Te, Co, Ni, Cu, Al, Mo, Rh, Pd, Ag, W, Pt and Au or an alloy of two or more of them, or is formed of a ceramic comprising one or more selected from the group consisting of Mg, Al, Si and Zr.

12. The fuel cell of claim 1, wherein the stack of fuel cell elements is formed of the fuel cell elements stacked in such a manner that the cathode layer of one element and the anode layer of another element are in direct contact with each other.

13. The fuel cell of claim 1, wherein at least the cathode and anode layers of the stack of fuel cell elements are porous, and wherein the stack of fuel cell elements is contained in the container so that the layers of the stack of fuel cell elements are parallel to the direction of flow of the mixed fuel gas flowing from the feed port to the exhaust port.

14. The fuel cell of claim 13, wherein the porous layers have an open porosity equal to or greater than 20%.

15. The fuel cell of claim 13, wherein the porous layers have an open porosity of 30 to 70%.

16. The fuel cell of claim 1, wherein the cathode, anode and electrolyte layers of the stack of fuel cell elements are porous, and wherein the stack of fuel cell elements is contained in the container so that the layers of the stack of fuel cell elements are perpendicular to the direction of flow of the mixed fuel gas flowing from the feed port to the exhaust port.

17. The fuel cell of claim 16, wherein the porous layers have an open porosity equal to or greater than 20%.

18. The fuel cell of claim 16, wherein the porous layers have an open porosity of 30 to 70%.

19. The fuel cell of claim 1, wherein the cathode layer is formed of a manganite, gallate or cobaltite compound of lanthanum to which an element of group III of the periodic table is added.

20. The fuel cell of claim 1, wherein the anode layer is formed of a body supporting nickel cermet or platinum to which an electrolyte forming the electrolyte layer is added.

21. The fuel cell of claim 1, wherein the electrolyte layer is formed of a zirconia which is partially stabilized by an element of group III of the periodic table, or a cerium oxide which is doped with lanthanide.

22. The fuel cell of claim 1, wherein a single fuel cell element is used in place of the stack of fuel cell elements.

* * * * *